United States Patent
Ibsen

(10) Patent No.: US 10,995,242 B2
(45) Date of Patent: May 4, 2021

(54) COATING SYSTEM FOR COATING A SURFACE OF A SUBSTRATE

(71) Applicant: Patentee ApS, Risskov (DK)

(72) Inventor: Ditte Hofman Ibsen, Hovedgård (DK)

(73) Assignee: PATENTCO APS, Risskov (DK)

( * ) Notice: Subject to any disclaimer, the term of this patent is extended or adjusted under 35 U.S.C. 154(b) by 447 days.

(21) Appl. No.: 15/739,262

(22) PCT Filed: Jun. 24, 2016

(86) PCT No.: PCT/DK2016/050223
§ 371 (c)(1),
(2) Date: Dec. 22, 2017

(87) PCT Pub. No.: WO2016/206702
PCT Pub. Date: Dec. 29, 2016

(65) Prior Publication Data
US 2018/0179420 A1  Jun. 28, 2018

(30) Foreign Application Priority Data

Jun. 25, 2015  (DK) .......................... PA 2015 70392

(51) Int. Cl.
*C09J 7/25* (2018.01)
*F01D 5/28* (2006.01)
(Continued)

(52) U.S. Cl.
CPC ................. *C09J 7/255* (2018.01); *B32B 3/02* (2013.01); *B32B 3/266* (2013.01); *B32B 5/02* (2013.01);
(Continued)

(58) Field of Classification Search
CPC ............ B32B 2255/02; B32B 2255/26; B32B 2255/28; B32B 2262/0261;
(Continued)

(56) References Cited

U.S. PATENT DOCUMENTS

| 4,824,498 A | 4/1989 | Goodwin |
| 5,782,607 A | 7/1998 | Smith |
(Continued)

FOREIGN PATENT DOCUMENTS

| WO | 2010117262 A1 | 10/2010 |
| WO | 2013092211 A1 | 6/2013 |
| WO | 2013172894 A2 | 11/2013 |

OTHER PUBLICATIONS

International Search Report for corresponding application PCT/DK2016/050223 filed Jun. 24, 2016; dated Sep. 19, 2016.

*Primary Examiner* — Michael B Nelson
(74) *Attorney, Agent, or Firm* — Cantor Colburn LLP

(57) ABSTRACT

Coating system (1) for coating a surface (3) of a substrate (5), the coating system (1) comprising; a coating (7), and an adhesive layer (9), that is disposed between the substrate (5) and the coating (7), wherein the adhesive layer (9) comprises a first adhesive layer portion (13) adjacent the substrate (5) and a second adhesive layer portion (15) adjacent the coating (7) and a carrier (11) placed between said first and second adhesive layer portions (13, 5), wherein the first adhesive layer portion (13) is composed of a first adhesive layer material, wherein the second adhesive layer portion (15) is composed of a second adhesive layer material, wherein the first adhesive layer material and the second adhesive layer material is having an adhesive or bond strength to the surface (3) of the substrate (5) and to the coating (7) respectively that exceeds their respective cohesive or tensile strength, wherein the first and second adhesive layer materials and carrier (11) combination is configured for having an adhesive strength that is less than their respective cohesive or tensile strength, wherein the carrier (11) is configured with grab tensile properties such that the carrier (11) in combination with the second adhesive layer (Continued)

portion (15) and the coating (7) will separate from the first adhesive layer portion (13) under the action of a peeling force.

19 Claims, 9 Drawing Sheets

(51) Int. Cl.
*B32B 7/12* (2006.01)
*B32B 5/02* (2006.01)
*B32B 3/26* (2006.01)
*B32B 27/12* (2006.01)
*B32B 27/40* (2006.01)
*B32B 7/06* (2019.01)
*B32B 27/06* (2006.01)
*B32B 5/08* (2006.01)
*B32B 5/26* (2006.01)
*B32B 3/02* (2006.01)
*F03D 13/25* (2016.01)
*F03D 1/06* (2006.01)
*F03B 17/06* (2006.01)

(52) U.S. Cl.
CPC .............. *B32B 5/022* (2013.01); *B32B 5/024* (2013.01); *B32B 5/08* (2013.01); *B32B 5/26* (2013.01); *B32B 7/06* (2013.01); *B32B 7/12* (2013.01); *B32B 27/06* (2013.01); *B32B 27/12* (2013.01); *B32B 27/40* (2013.01); *F01D 5/288* (2013.01); *F03D 1/0675* (2013.01); *F03D 13/25* (2016.05); *B32B 2255/02* (2013.01); *B32B 2255/26* (2013.01); *B32B 2255/28* (2013.01); *B32B 2262/0261* (2013.01); *B32B 2262/0269* (2013.01); *B32B 2262/0276* (2013.01); *B32B 2262/065* (2013.01); *B32B 2262/101* (2013.01); *B32B 2262/106* (2013.01); *B32B 2262/108* (2013.01); *B32B 2262/14* (2013.01); *B32B 2307/748* (2013.01); *B32B 2419/00* (2013.01); *B32B 2603/00* (2013.01); *B32B 2605/18* (2013.01); *F03B 17/061* (2013.01); *F05B 2230/90* (2013.01); *F05B 2280/6011* (2013.01); *F05D 2230/90* (2013.01); *F05D 2300/224* (2013.01); *F05D 2300/30* (2013.01); *F05D 2300/42* (2013.01); *F05D 2300/43* (2013.01); *F05D 2300/611* (2013.01); *Y02E 10/72* (2013.01); *Y02T 50/60* (2013.01)

(58) Field of Classification Search
CPC .... B32B 2262/0269; B32B 2262/0276; B32B 2262/065; B32B 2262/101; B32B 2262/106; B32B 2262/108; B32B 2262/14; B32B 2307/748; B32B 2419/00; B32B 2603/00; B32B 2605/18; B32B 27/06; B32B 27/12; B32B 27/40; B32B 3/02; B32B 3/266; B32B 5/02; B32B 5/022; B32B 5/024; B32B 5/08; B32B 5/26; B32B 7/06; B32B 7/12; F01D 5/288; F03D 1/0675; F03D 13/25; F05D 2300/224; F05D 2300/30; F05D 2300/42; F05D 2300/43; F05D 2230/90; F05D 2300/611; F05B 2230/90; F05B 2280/6011; Y02E 50/60; C09J 7/255; F03B 17/061; Y02E 10/72; Y02E 10/727
See application file for complete search history.

(56) References Cited

U.S. PATENT DOCUMENTS

| | | | |
|---|---|---|---|
| 6,696,124 | B1 | 2/2004 | Merz |
| 7,807,251 | B1 | 10/2010 | Wallach |
| 2003/0190464 | A1 | 10/2003 | Narum |
| 2004/0118978 | A1 | 6/2004 | Anning |
| 2006/0093809 | A1 | 5/2006 | Hebrink |
| 2010/0135820 | A1 | 6/2010 | Olson |
| 2012/0163981 | A1 | 6/2012 | Hong |
| 2014/0363291 | A1 | 12/2014 | Gaillardon |
| 2015/0132140 | A1* | 5/2015 | Haag ............... F01D 5/286 416/224 |
| 2015/0151522 | A1* | 6/2015 | Shah ................ C08F 283/01 428/423.7 |

* cited by examiner

COATING SYSTEM FOR COATING A SURFACE OF A SUBSTRATE

TECHNICAL FIELD

The present invention relates to a coating system for coating a surface of a substrate.

Moreover, the present invention relates to a method of repairing a damaged coating of a coating system on a surface of a substrate.

Additionally, the present invention relates to a method of retrofitting said coating system to the surface of a substrate.

Furthermore, the present invention relates to a substrate comprising said coating system.

BACKGROUND

Surfaces that are exposed to the elements may be subject to erosion caused by abrasion by particles and water droplets in the air that are present in the environment. The erosion process is accelerated when the particles are passing the surface at high speed. Moreover, the density of particles is also influencing the progression of the erosion.

This applies to surfaces placed in adverse environments and surfaces placed outside and exposed to the weather as well as submerged surfaces that are exposed to subsea conditions.

In order to protect the surfaces and underlying structure a protective coating is applied to the surface. The protective coating may act as a sacrificial layer that will prevent the erosion from removing material from the underlying structure. This is provided that the coating is replaced or repaired at intervals before the protective coating is completely eroded through.

Should the protective coating be completely removed such that the underlying structure is exposed to the environment said underlying structure may be permanently damaged. In case of a damaged underlying structure the process of restoring the underlying structure to its original strength and function may be costly if possible at all.

An example of a structure exposed to erosion is a blade of a wind turbine, more specifically the leading edge of the blade. The speed of the air flowing past the blade increases towards the tip of the blade. Moreover, if the rotational speed of the wind turbine is increased the tip speed increases and thus the speed of the air flowing past the blade increases. Therefore the erosion becomes more severe with increased span and increased rotational speed of the wind turbine. In practise the erosion is not linear but may vary along the span.

As the leading edge erodes the performance of the wind turbine blade deteriorates. It has been found that even light erosion may lead to a 5% decrease in annual energy production, and heavy erosion may reduce energy production by as much as 25%.

Other examples of structures exposed to erosion include but are not limited to blades of gas turbines, steam turbines or water turbines, leading edge surfaces of aircraft, exposed surfaces of buildings in desert areas, leading edge surfaces of tidal stream generators.

To slow down the development of erosion and to prevent permanent damage to a structure, a protective coating especially suited for protection against abrasion may be applied to the surface of the structure. The protective coating is usually formed of a resilient material that resists abrasion.

For a wind turbine, experiences have shown that leading edge erosion begins early in the life of a blade depending on site location and wind classes. Leading edges on blades without protection as young as three years old will begin to show signs of light erosion. Leading edges that are not repaired at this stage may have a damaged underlying structure as early as year five. At this time the blade may provide as little as 75% of the intended yearly energy production.

Wind turbine blades having a service life of 20 years would require leading edge repair as much as 6-7 times during its life in order to provide an acceptable lifetime energy production.

Leading edge maintenance can be performed on-site with the blade mounted on the wind turbine. This is applicable to on-shore as well as off-shore applications. However, in relation to wind turbines located off-shore the challenges with leading edge maintenance are amplified.

For example all materials that are removed from the blade or used during the maintenance action, except clean water, shall be collected and taken back to shore due to environmental restrictions.

Therefore any remaining protective coating that must be removed in order to leave a clean base surface for the application of a new layer of protective coating must be collected and taken to shore. Special tools are required to achieve this which increases the cost of the maintenance operation.

The coating is difficult to remove due to its resilience and adherence to the surface. Methods of removal of the damaged protective coating include manually scraping, grit blasting or sanding. This is time consuming and therefore requires the wind turbine to be stopped for a relatively long time, during which the wind turbine is out of production. The duration of the downtime determines when the maintenance procedure can be performed because certain weather conditions are required for safety- and processing reasons. Therefore an increased downtime reduces the availability of time windows in which the maintenance procedure can be completed.

Additionally, most often the coating is only removed to a level where the surface is clean and level and not to the surface of the underlying structure. Therefore, over time, there is a build-up of coating that changes the aero dynamic profile of the coated structure. This is a major problem in relation to a wind turbine blade, where the aerodynamic shape of especially the leading edge is critical to the performance of the blade.

The surface must be thoroughly cleaned before a new layer of protective coating is applied in order to ensure sufficient adhesion of the protective covering.

An object of the present invention is to provide an improved coating system for a surface subject to erosion.

SUMMARY OF INVENTION

According to the present invention, this is achieved by a coating system for coating a surface of a substrate, the coating system comprising; a coating, and an adhesive layer, that is disposed between the substrate and the coating, wherein the adhesive layer comprises a first adhesive layer portion adjacent to the substrate and a second adhesive layer portion adjacent to the coating and a carrier placed between said first and second adhesive layer portions, wherein the first adhesive layer portion is composed of a first adhesive layer material, wherein the second adhesive layer portion is composed of a second adhesive layer material, wherein the first adhesive layer material and the second adhesive layer material is having an adhesive or bond strength to the surface of the substrate and to the coating respectively that exceeds their respective cohesive or tensile strength, wherein the first and second adhesive layer materials and carrier combination is configured for having an adhesive strength that is less than their respective cohesive or tensile strength, wherein the carrier is configured with grab tensile properties such that the carrier in combination with the second adhesive layer portion and the coating will separate from the first adhesive layer portion under the action of a peeling force.

In the present application the term "adhesive" includes any substance that upon application to the surfaces of materials binds them together and resists separation.

This includes non-reactive adhesives, for example drying adhesives and hot adhesives such as thermoplastics and reactive adhesives, for example multi-part adhesives such as polyester resin, polyurethane resin, epoxy resin and single component adhesives.

Moreover, according to the present invention, this is achieved by a method of repairing a damaged coating of a coating system on a surface of a substrate, wherein an adhesive layer comprising a carrier embedded between a first adhesive layer portion adjacent the surface of the substrate and a second adhesive layer portion adjacent the coating is disposed between the substrate and the coating, wherein the damaged coating is removed by applying a peeling force to the carrier, such that the carrier separates from the first adhesive layer portion while carrying the damaged coating, and such that the first adhesive layer portion is exposed, and wherein the coating system is re-established by applying a replacement coating system to the exposed first adhesive layer portion.

The repair may be repeated as necessary.

Furthermore, according to the present invention, this is achieved by a method of retrofitting a coating system according to the invention to a surface of a substrate, wherein the method comprises the steps of:

a. preparing the surface of the substrate for receiving the first adhesive layer,
b. establishing the first adhesive layer portion by applying the first adhesive layer material,
c. placing the carrier on the first adhesive layer portion,
d. securing the carrier to the first adhesive layer portion
e. applying the second adhesive layer material to the carrier, and
f. applying the coating to the adhesive layer, wherein step e and f may be performed at the same time if the second adhesive layer material and the coating material is identical.

Additionally, according to the present invention, this is achieved by a substrate comprising a coating system according to the invention.

In one embodiment the substrate is a wind turbine blade.

The substrate according to the invention can cover part of the wind turbine blade.

The substrate according to the invention can cover the entire wind turbine blade.

As the coating on the substrate is exposed to the elements the coating may gradually become damaged and eroded. When the damage has reached a level where the performance of the coated substrate in a given application is outside acceptable limits the coating must be repaired to restore the performance.

An example of an application may be a leading edge protection coating on a wind turbine blade. Where the leading edge protection is gradually eroded and thus the performance of the blade is reduced below acceptable limits.

Another example of an application where erosion may be a problem may be blades of gas turbines, steam turbines or water turbines, leading edge surfaces of aerospace vehicles, exposed surfaces of buildings in desert areas, leading edge surfaces of tidal stream generators.

When the coating is due for repair the damaged coating is removed by applying a peeling force to the carrier and thereby removing the coating in an efficient manner.

In an embodiment of the invention the coating system comprises a plurality of coating layers on top of each other.

Each individual layer of coating may have different properties. For example tracer layers of different colours. This enables clear indication at a distance as to the depth of erosion and damage. When the lowermost layer is exposed the coating system is due for repair, as further removal of material may damage the structure of the substrate.

Moreover, the surface that is exposed after removing the carrier is chemically clean and ready for a new application of the coating system to restore the damaged coating without the necessity for further chemical or mechanical cleaning action.

The carrier can be removed in one piece. The present invention is therefore especially suited for off-shore applications where all material that is removed must be collected and taken to shore.

The carrier is removed by, as a first step, locally removing the coating and the second adhesive layer portion and thereby exposing an edge of the carrier, such that the edge of the carrier can be held manually or by an adapter that can apply the necessary grip to apply a peeling force sufficient for removing the carrier.

Then, as a second step, a peeling force is applied to the carrier and the carrier including the remaining coating on top of the carrier is removed from the surface of the substrate less the first adhesive portion which remains attached to the surface of the substrate.

The separation between the carrier and the first adhesive portion is well defined and confined to the interface between the first adhesive layer portion and the carrier because the first adhesive layer material is selected with properties such that its adhesive or bond strength to the surface of the substrate exceeds its cohesive or tensile strength and because the carrier is selected such that the adhesive strength of the carrier to the first adhesive layer portion is less than the cohesive or tensile strength of the first adhesive layer material. Thus, the carrier carrying the coating will separate cleanly from the first adhesive layer portion at their interface.

The substrate is defined as an item to be covered by the coating of the coating system according to the present invention. The surface that receives the coating can include the complete surface of the item or part of the surface.

For the purpose of this application the substrate is assumed to have the necessary structural integrity to support the coating system without structural failure. This applies to the application of the coating system as well as the removal by peeling off the coating with the carrier.

In an exemplary embodiment, the substrate is the blade of a wind turbine. The surface that receives the coating system according to the invention is the part of the blade that is subject to handling damages during installation and maintenance or erosion during operation. The part of the blade most prone to these damages is the leading edge of the blade, and more specifically the part of the leading edge closer to the tip of the blade. The exact extend of the surface that is coated with the coating system according to the invention may be based on the vast amount of data from operation of wind turbines in many different environments.

The coating may be any coating material that is compatible with the adhesive layer materials and that is suitable for the particular application.

For example a coating suitable for providing an erosion shield for protecting the substrate against damage from erosion, more specifically a coating suitable for providing an erosion shield on the leading edge of a wind turbine blade or a blade of a tidal stream generator.

In an embodiment of the invention, the adhesive layer is applied to the surface of the substrate by the following steps:
a. preparing the surface of the substrate to receive the coating system, if necessary.
b. applying a first adhesive layer material to the surface of the substrate, for establishing the first adhesive layer portion,
c. applying the carrier onto the first adhesive layer portion,
d. applying second adhesive layer material onto the carrier, for establishing the second adhesive layer portion, and
e. applying the coating onto the second adhesive layer portion, curing cycles are applied between steps as necessary.

During step c, the carrier is worked into the first adhesive layer portion.

Some of the first adhesive layer material may flow through the carrier to the other side.

Thereby some or all of the material to be applied in step d is already present and can be applied to the carrier by distributing it across the carrier. If necessary, additional material is added to establish the second adhesive layer portion.

The coating system according to the present application can be applied during manufacture of a product, as a repair to an existing coating according to the invention or as a retrofit on an existing product.

The later case may require the existing coating to be partly or completely removed from the surface of the substrate before applying the coating system according to the invention, to ensure the structural integrity of the base of the coating system according to the invention.

The properties of the surface of the substrate, the coating, the adhesive layer materials and the carrier are all interdependent in relation to the effect achieved with the invention, namely that the carrier is separating cleanly from the first adhesive layer portion under the action of a peeling force leaving a clean surface for the reapplication of a coating system. Therefore, the selection of specific adhesive layer materials and a carrier is specific to a given application.

In embodiments of the invention said adhesive or bond strength $AS_1$, $AS_2$ to the surface of the substrate and to the coating, respectively, is between 6 and 12 MPa (ASTM D4541) and the respective cohesive or tensile strength $TS_1$, $TS_2$ of said first adhesive layer material and second adhesive layer material is between 4 and 6 MPa (ASTM D4541). Hereby are advantageous embodiments of the invention achieved.

To determine which adhesive layer materials and which carrier is suitable for a specific application the skilled person can perform a series of tests should there be no information available in relation to the cohesive strength or the adhesive strength.

The cohesive or tensile strength of the adhesive layer materials may be determined by tensile testing, for example ASTM-D-2370 or ISO R 527.

The adhesive strength between the surface of the substrate and the first adhesive layer material and the second adhesive layer material and the coating can be established with a dolly tester, for example according to ASTM-D-4541 Annex 5 or ISO 4624.

The necessary peeling force to separate the carrier from the first adhesive layer portion can for example be established with a climbing drum peel test according to ASTM-D-1781.

The climbing drum peel test can also verify that the grab tensile properties of the carrier is sufficient to maintain the integrity of the carrier when peeling off the carrier, second adhesive layer portion and coating combination by subjecting the coating system to the climbing drum peel test.

A parameter for selecting the first and second adhesive layer materials are primarily their ability to adhere to the surface of the substrate, the coating and the carrier. The first and second adhesive layer materials are selected such that the coating is sufficiently attached to the surface of the substrate in all operational conditions of the substrate. This includes the attachment of the carrier to the first adhesive layer portion.

On one hand the adhesive strength between the carrier and the first adhesive layer material must be less than the adhesive strength between the first adhesive layer material and the surface of the substrate and on the other hand the adhesive strength between the carrier and the first adhesive layer material must be sufficient to ensure that integrity of the carrier in combination with the second adhesive layer portion and the coating is ensured during all operating conditions of the application.

The requirements related to the operating conditions can be established based on experience and engineering judgement of a skilled person.

A parameter for selecting the carrier is its ability to hold together the coating while it is being peeled off the first adhesive layer portion and its ability to provide a clean separation from the first adhesive layer portion. The necessary peeling force to separate the carrier from the first adhesive layer portion determines if the carrier and coating combination can be manually removed or if a special tool is necessary.

The adhesive strength of the carrier to the first and second adhesive layer materials is influenced by a number of factors, most notably of which are the carrier material, the weave in case of a fabric based carrier and the number and distribution of apertures or perforations for a film.

In one embodiment of the invention the thickness $T_c$ of said carrier is in the range of 60 to 200 µm, for example in the range of 80 to 120 µm, such as approx. 100 µm, and/or the thickness $T_1$, $T_2$ of said first and second adhesive layer portion is in the range of 40 to 300 µm, for example in the range of 60 to 100 µm, and in the range of 80 to 300 µm, for example in the range of 80 to 100 µm, respectively. Hereby is achieved an advantageous embodiment of the invention.

The skilled person may combine some or all of the parameters above for a given application to define the first and second adhesive layer materials and the carrier. The resulting combination can be verified by the above tests. The thicknesses T1, T2 of the first and second adhesive layer portion may be the same or different. For thin layer portions, for example less than 100 µm, the second adhesive layer portion is preferably thicker than the first adhesive layer portion. Depending on the application technique, e.g. painting, spraying, etc., the thickness T1, T2 of the first and second adhesive layer portion may be fluctuating over the area covered by the coating system.

In one embodiment of the invention the first and/or second adhesive layer material is selected among consolidated and/or curable adhesives.

It is herewith achieved that the first and/or second adhesive layer material can be applied to the surface of the substrate in a viscous state. The coating system can therefore be easily applied to curved surfaces and is especially suited for surfaces with double curvature.

Consolidated adhesives include thermoplastics.

In a further embodiment of the invention the first adhesive layer material and/or the second layer material and/or the coating is composed of identical materials.

It is herewith achieved that the number of materials used is reduced.

In a further embodiment of the invention the carrier is a textile.

In the present application the term textile refers to any material made of interlacing fibres.

This includes wovens and non-wovens.

Fibres may include natural or synthetic fibres.

Examples of fibres for the carrier includes but are not limited to natural fibres such as bamboo, hemp or flax and polymeric fibres, for example nylon, aramid, polyester and inorganic fibres such as glass, carbon, basalt and metals. Moreover, the fibres may be a combination of said materials.

An example of a carrier is a so called peel ply. Peel ply is already commonly used in the preparation of fibre reinforced laminates with resins. Peel ply is a fabric that is applied over the last layer of cloth in the laminate before the laminate is allowed to cure. Examples of peel ply materials are nylon fabric, coated fibre reinforced glass fabrics that will not bond to the laminate rather it will mechanically adhere to the laminate. As the peel ply will not form a structural part of the laminate it can be peeled off. Peel ply has been developed to be used in the lamination process. For example if the lamination process has to be halted before all plies of cloth have been applied. Then the surface of the unfinished laminate is covered with a layer of peel ply. The peel ply will protect the surface of the laminate against contamination. The peel ply is removed before the lamination process recommence.

In the present application the carrier is embedded within the final product. It is applied to the surface of the substrate after an adhesive material has been applied and subsequently covered with additional adhesive layer material and coating.

In a further embodiment of the invention the carrier is a film having a plurality of apertures or perforations.

The apertures or perforations will provide a bridge between the first adhesive layer portion and the second adhesive layer portion.

The number, size, shape and distribution of the apertures or perforations provides a means of controlling and varying the adhesive strength or bond strength of the carrier to the first adhesive layer portions. The bridges provide the mechanical adherence between the carrier and the first and second adhesive layer materials. To peel off the carrier the bridges must be broken.

In a further embodiment of the invention the adhesive layer comprises a plurality of discrete carriers.

For large substrate surfaces it may be an advantage to limit the size of the carrier by distributing a plurality of separate carriers across the surface. If the damaged coating is only covering part of the surface of the substrate this embodiment enables the removal of only part of the coating. Another advantage is that the size of the carrier may be more manageable by the personnel in contrast to a large carrier.

In this embodiment the carriers are aligned in a side-by-side configuration.

In an embodiment the plurality of carriers are located in a configuration where they overlap partly or completely.

In an embodiment the plurality of carriers are located in a stacked configuration.

In another embodiment of the invention said plurality of discrete carriers in a stacked configuration comprises at least a third adhesive layer portion placed between said first and second adhesive layer portions.

The use of a plurality of carriers in a stacked configuration provides an advantageous possibility of removing one carrier and the coating layer from a substrate as part of a repair method. The stack of remaining carriers is recoated to establish the coating system on the substrate again. A stacked configuration on the substrate ensures that the coating system may easily be repaired a number of times without carriers having to be refitted on the substrate.

In an embodiment, the stacked configuration may be obtained by repeating above-mentioned steps c, d and e one or more times.

In a further embodiment of the invention the coating is an erosion resistant material.

This will increase the lifetime of the coating when operating in erosion prone environments.

In a further embodiment of the invention the first and second adhesive layer materials are selected among fillers, coatings, primers, adhesives and resins.

In a further embodiment of the invention the coating system comprises an embedded tear strip.

The tear strip is embedded under the coating and when pulled it will cut through the coating and provide access to the carrier.

This ease the removal of the carrier as the tear strip can mark the outline of the carrier.

In an embodiment the tear strip is placed between the first adhesive layer portion and the carrier.

In this embodiment the tear strip when pulled will cut the carrier into two or more pieces.

In another embodiment said coating system is applied as part of the substrate manufacturing process before the substrate enters service.

Thereby is enabled an efficient, convenient and reliable way of applying the coating system of the invention to the substrate before the substrate leaves manufacturing for in-field operation.

Furthermore, to achieve a substrate with an improved coating system according to the invention, a substrate may be manufactured with a coating system as described above, by the steps of:

a. providing a substrate,
b. preparing the surface of the substrate for receiving the first adhesive layer portion,
c. establishing the first adhesive layer portion by applying the first adhesive layer material,
d. placing the carrier on the first adhesive layer portion,
e. securing the carrier to the first adhesive layer portion
f. applying the second adhesive layer material to the carrier, and
g. applying the coating to the adhesive layer.

In an advantageous embodiment of manufacturing substrate with a coating system, the substrate is a wind turbine blade, step b comprises preparing the entire surface or parts of the surface such as the leading edge or part of the leading edge e.g. at or in proximity of the wind turbine blade tip, and the coating is preferably a leading edge protection coating.

In an embodiment the substrate is part of an offshore application to ensure an advantageous substrate coating in a usually difficult work environment.

The present invention is suitable for applications where the coating is subject to replacement.

When repairing the coating the coating system may be replaced by a coating system according to the invention or a conventional coating system.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

The invention will be explained in more detail below with reference to the accompanying drawing, where.

In the following, the invention will be described in greater detail with reference to embodiments shown by the enclosed figures. It should be emphasized that the embodiments shown are used for example purposes only and should not be used to limit the scope of the invention.

DESCRIPTION OF THE EMBODIMENTS

In the explanation of the figures, identical or corresponding elements will be provided with the same designations in different figures. Therefore, no explanation of all details will be given in connection with each single figure/embodiment.

Figure 1A:
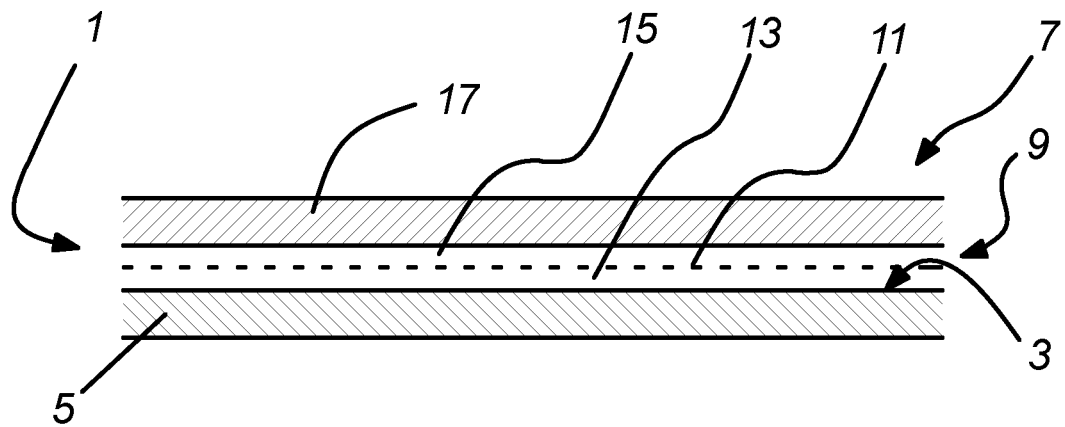
FIG. 1a shows a cross section of a first embodiment of a coating system according to the invention.
Figure 1B:
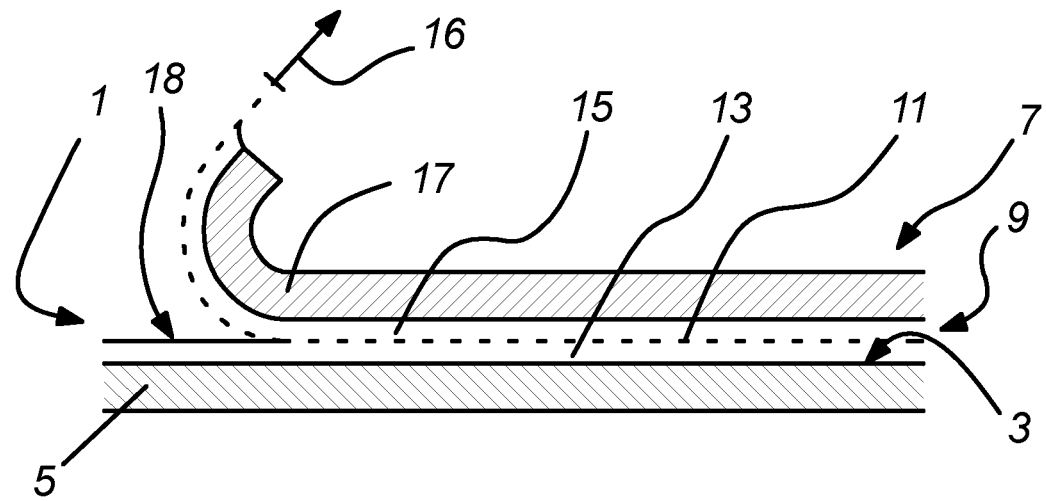
FIG. 1b shows a cross section of the embodiment of the coating system of FIG. 1a, where the carrier is subjected to the action of a peeling force.

FIGS. 1a and 1b shows a cross section of a first embodiment of a coating system 1 for coating the surface 3 of a substrate 5.

The coating system 1 comprises a coating 7 and an adhesive layer 9.

The coating 7 may be any coating that is suitable for a given application. An example of a coating 7 is an erosion resistant material, such as a material with relatively higher resistance to erosion for example by a flow of fluids, than the substrate itself.

The adhesive layer 9 comprises a carrier 11 and an adhesive. The adhesive layer material is divided by the carrier 11 into a first adhesive layer portion 13 that adheres to the surface 3 of the substrate 5 and a second adhesive layer portion 15 that adheres to the coating 7. Both adhesive layer portions 13, 15 adhere to the carrier 11.

The first adhesive layer portion 13 comprises a first adhesive layer material and the second adhesive layer portion 15 comprises a second adhesive layer material.

The first and second adhesive layer material has an adhesive or bond strength to the surface 3 of the substrate 5 and to the coating 7 respectively that exceeds its cohesive or tensile strength. In contrast the adhesive or bond strength between the first adhesive layer material and the carrier 11 is less than the cohesive strength of both the first and second adhesive layer materials and the carrier, respectively.

When the carrier 11 is subjected to a peeling force, as indicated with arrow 16, it will separate from the first adhesive layer portion 13 at the interface between said first adhesive layer portion 13 and the carrier 11 as illustrated in FIG. 1b.

In FIG. 1b it can be seen how the coating 7 remains attached to the carrier 11, such that waste during removal of a damaged coating is minimized.

The second adhesive layer portion 15 and the coating 7 is locally removed near the edge of the carrier 11 to enable removal of the carrier 11.

In some instances the coating 7 may crack and become detached from the carrier 11. A brittle coating material will have this tendency.

The exposed surface 18 of the first adhesive layer portion 13 will form the base for a replacement coating system 1 to be applied to the substrate 5.

As the coating 7 is replaced a number of times there will be a gradual increase in thickness of the first adhesive layer portion 13. This is because a new first adhesive layer portion (not shown) is applied to the existing first adhesive layer portion 13 during each replacement action.

Figure 1C:
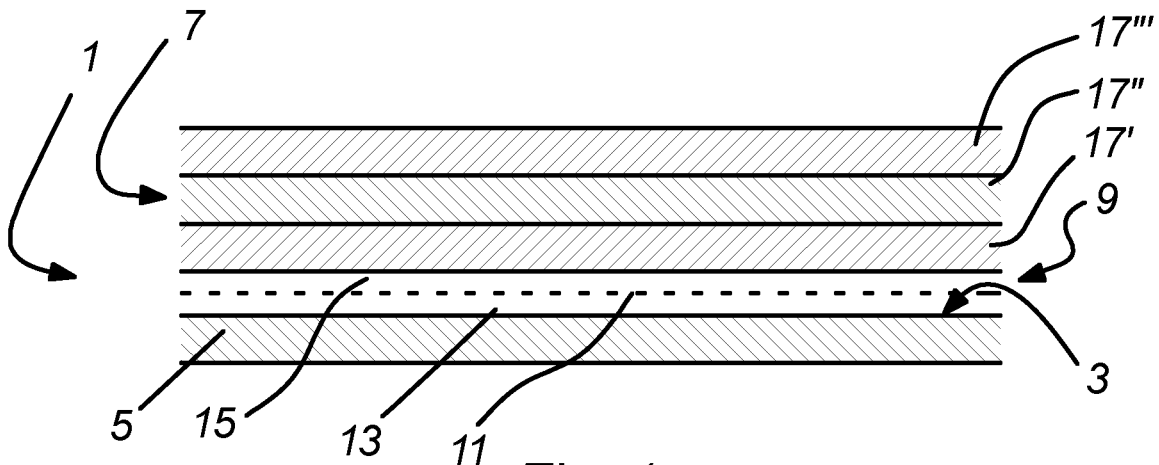
FIG. 1c shows a cross section of a second embodiment of a coating system according to the invention.

FIG. 1c shows a cross section of a second embodiment of a coating system 1 according to the invention.

The second embodiment differs from the first embodiment in that the second embodiment comprises a plurality of coating layers 17', 17", 17'''.

Figure 2:
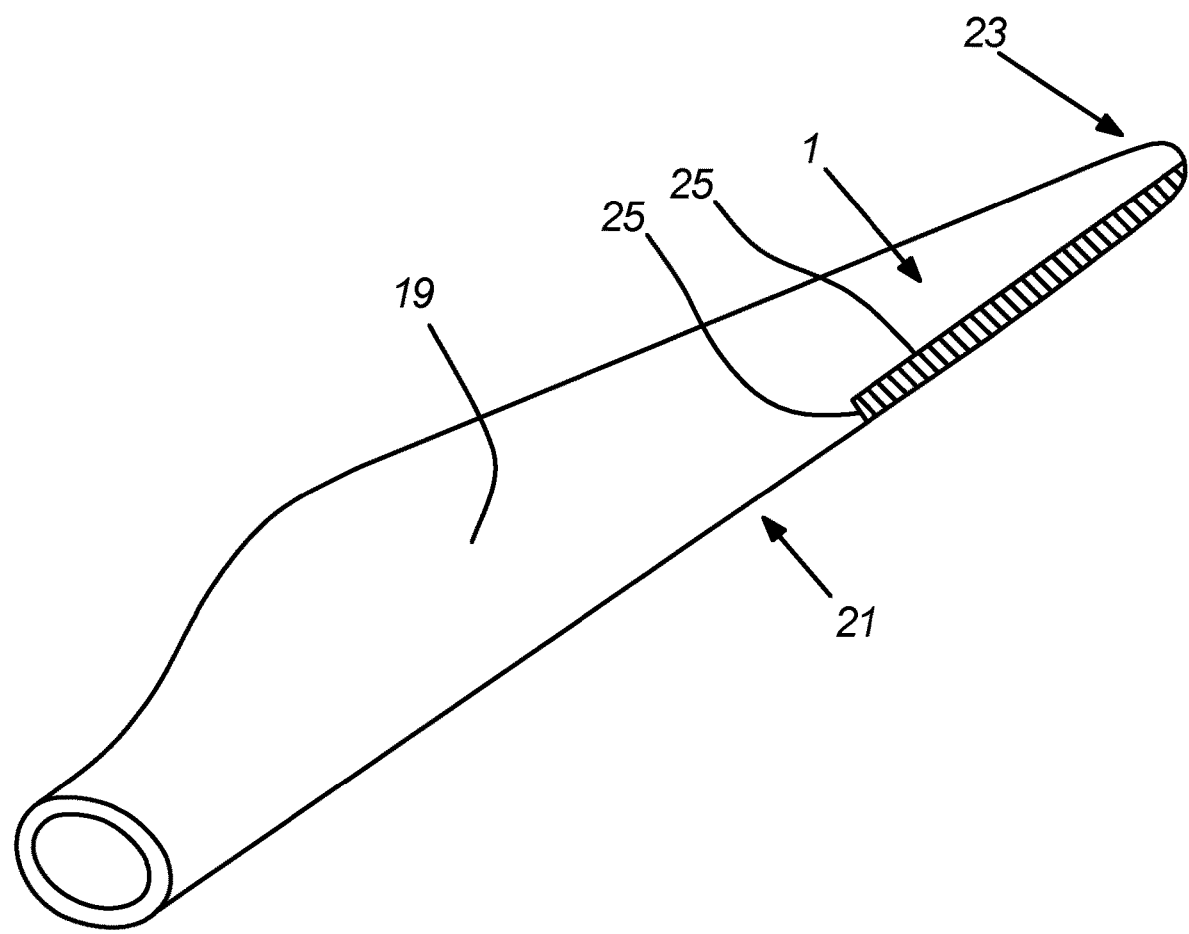
FIG. 2 shows a wind turbine blade comprising a coating system according to the invention.

FIG. 2 shows a wind turbine blade 19 comprising a coating system 1 according to the invention.

In the embodiment shown the coating system 1 is applied to the leading edge 21 of the wind turbine blade 19, more specifically the part of the leading edge 21 that is closer to the tip 23 of the blade.

The carrier is not visible on FIG. 2. However, in one embodiment the coating system 1 comprises a single carrier 11.

Tear strips 25 are embedded at the outline of the carrier 11. When pulling the tear strips 25 the coating 9 is cut and the carrier 11 becomes accessible.

In one embodiment (Not shown in FIG. 2) the coating system 1 comprises a plurality of discrete carriers 11.

In all embodiments shown the adhesive can be selected among curable adhesives.

In all embodiments shown the first and/or second adhesive layer materials and the coating can be composed of identical materials.

In all embodiments shown the carrier can be a fabric or a film having a plurality of perforations.

In all embodiments shown the coating may be an erosion resistant material.

FIGS. 3a to 3d show steps of a method for retrofitting a coating system according to an embodiment of the invention. Before retrofitting the coating system, the surface 3 of the substrate 5 should be clean and prepared, preferably including removing or priming any previously applied coating or adhesives.

Figure 3A:
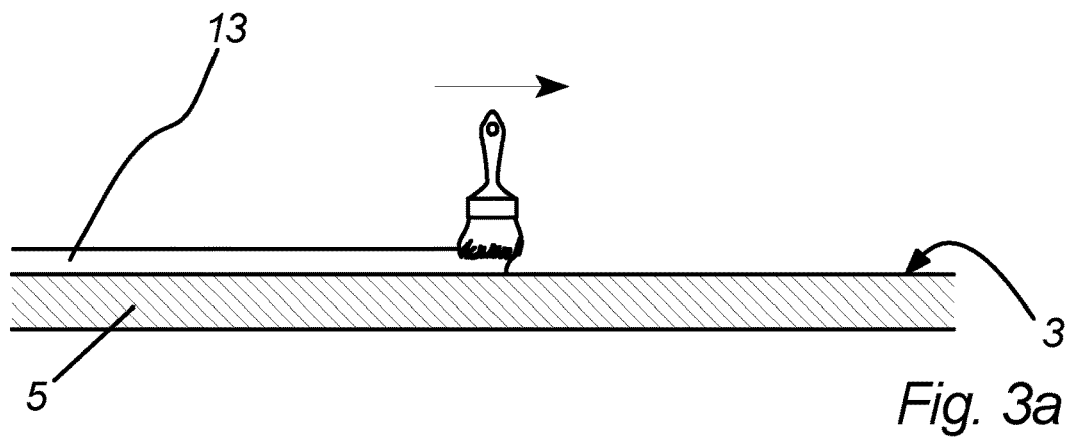
FIG. 3a-d show steps of a method for retrofitting a coating system according to the invention.

FIG. 3a shows the application of a first adhesive layer material e.g. with a paint brush, roller, spatula or spray to form a first adhesive layer portion 13 on the surface 3 on a substrate 5.

Figure 3B:
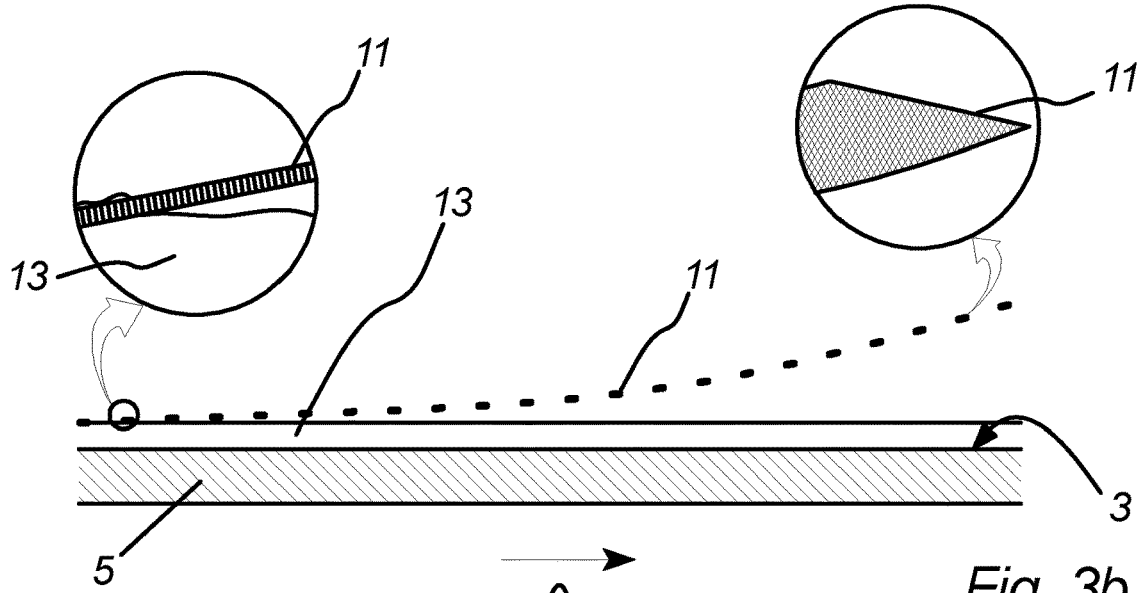

FIG. 3b shows the application of a carrier 11 on the first adhesive layer portion 13 wherein the carrier 11 is positioned on the not yet hardened first adhesive layer material.

The right enlargement of the Figure shows a section of the carrier 11 as seen slightly from above and with a plurality of apertures or perforations illustrated in the carrier.

The left enlargement of the Figure shows that some of the adhesive layer material of the first adhesive layer portion 13 flows through the carrier 11 to the other side via a plurality of apertures or perforations in the carrier.

Alternative embodiments without an adhesive soaked carrier 11 are also possible e.g., a carrier without a plurality of apertures or perforations but having a non-permeable surface structure capable of bonding with the adhesive layer material.

Figure 3C:
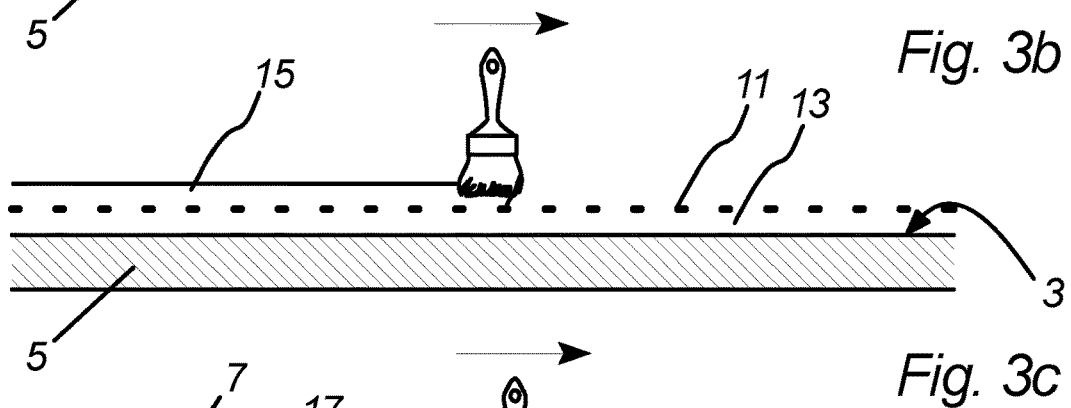

FIG. 3c shows the application of a second adhesive layer material e.g. with a paint brush, roller, spatula or spray to form a second adhesive layer portion 15 on the carrier 11. The second adhesive layer material may also bridge with the adhesive layer material of the first adhesive layer portion 13 which has flown through the plurality of apertures or perforations in the carrier 11. The established bridges provide mechanical adherence between the carrier 11 and the first and second adhesive layer materials 13, 15.

Figure 3D:
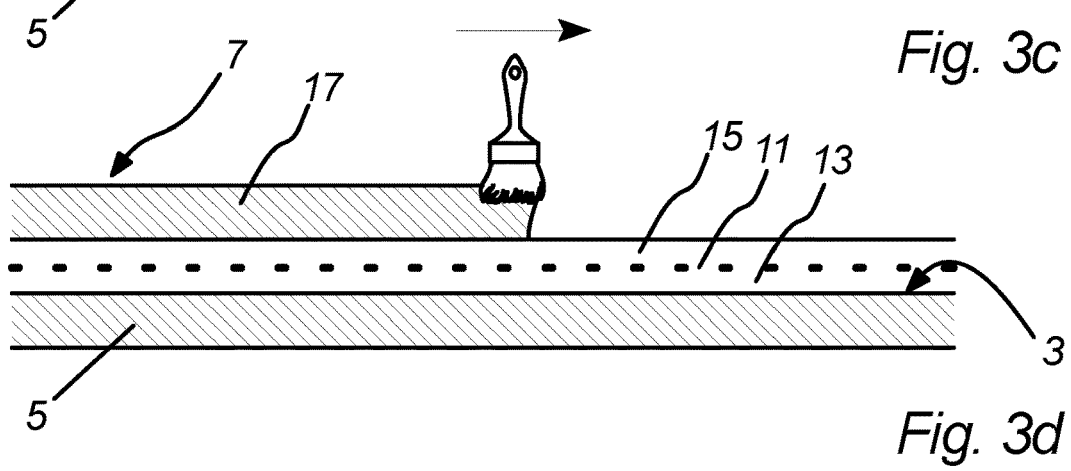

FIG. 3d shows the application of a coating layer 17 e.g. with a paint brush, roller, spray, spatula or e.g. as a, preferably adhesive, film, tape or sheet, on the second adhesive layer portion 15. The coating layer 17 is preferably applied after the curing of the first and second adhesive layer materials.

FIG. 4a-d show steps of a method for repairing a damaged coating of a coating system according to an embodiment of the invention.

Figure 4A:
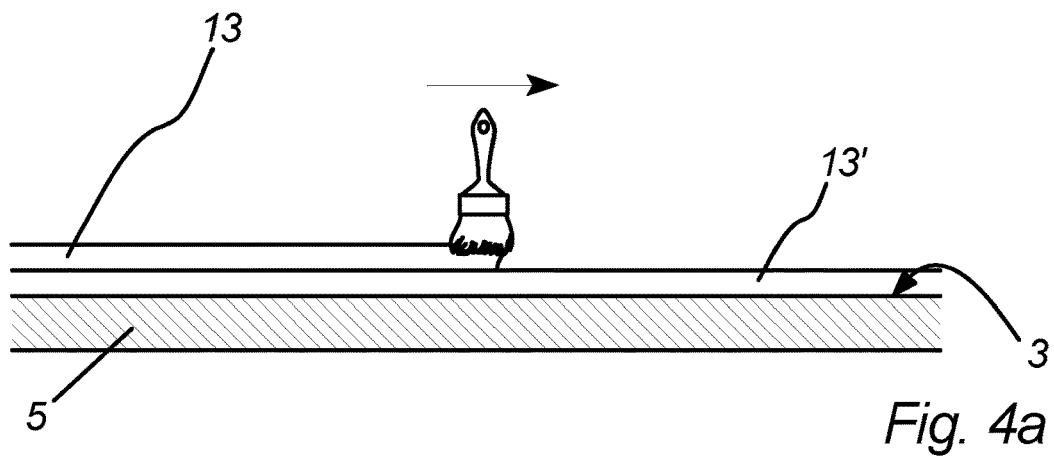
FIG. 4a-d show steps of a method for repairing a damaged coating of a coating system according to the invention.

FIG. 4a shows a substrate 5 after a damaged coating system has been removed by applying a peeling force to a carrier, such that the carrier separated from the first adhesive layer portion while carrying the damaged coating. This original first adhesive layer portion 13' is hereby exposed but remains on the surface 3 of the substrate 5. A first adhesive layer portion 13 is applied as a method step on the original first adhesive layer portion 13' e.g. with a paint brush, roller, spatula or spray.

Figure 4B:
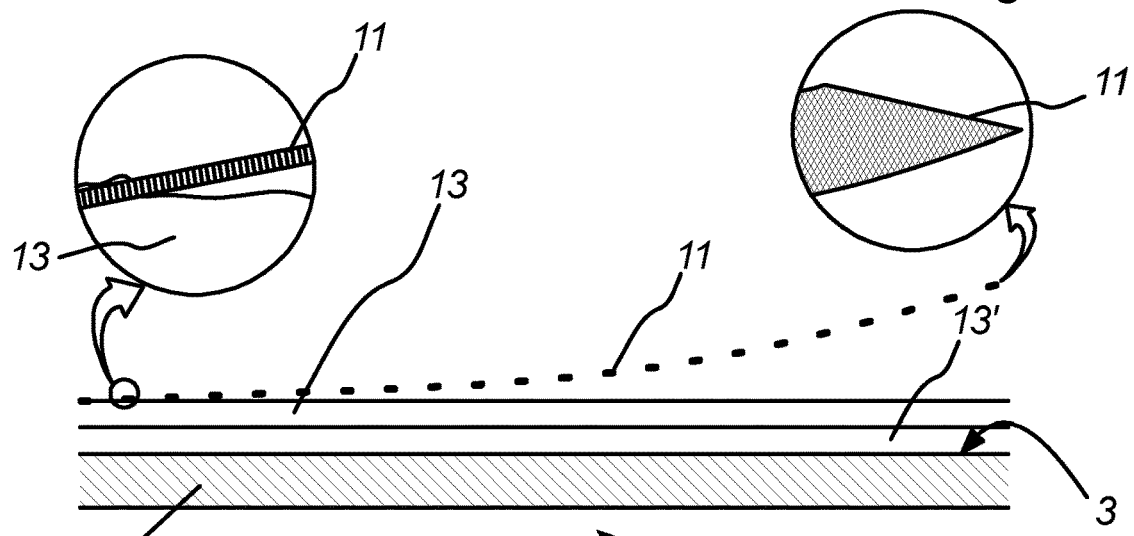
Figure 4C:
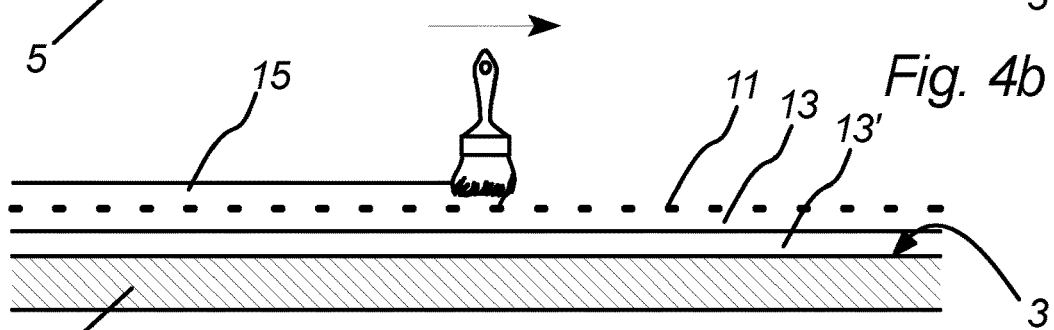
Figure 4D:
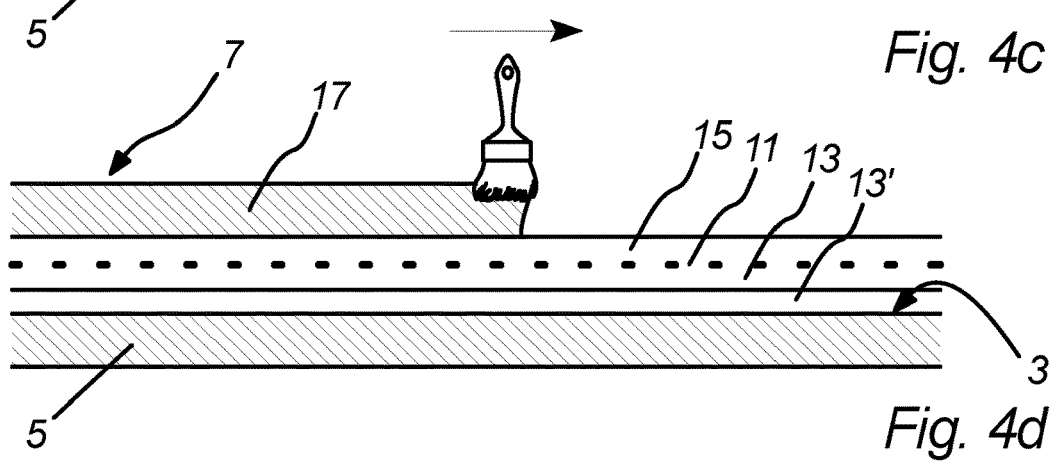

FIG. 4b-d show repair method steps corresponding to the retrofit method steps shown in FIGS. 3b-3d and as described above.

Figure 5:
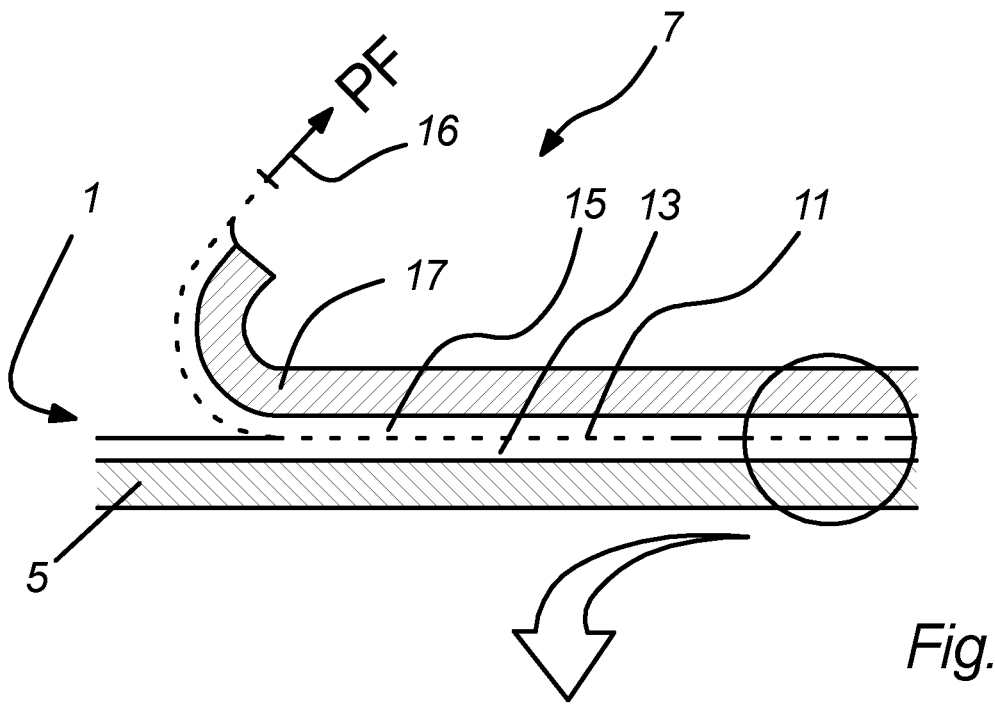
FIG. 5-5b shows thickness, adhesive and tensile strengths in a cross section of embodiments of a coating system according to the invention.
Figure 5A:
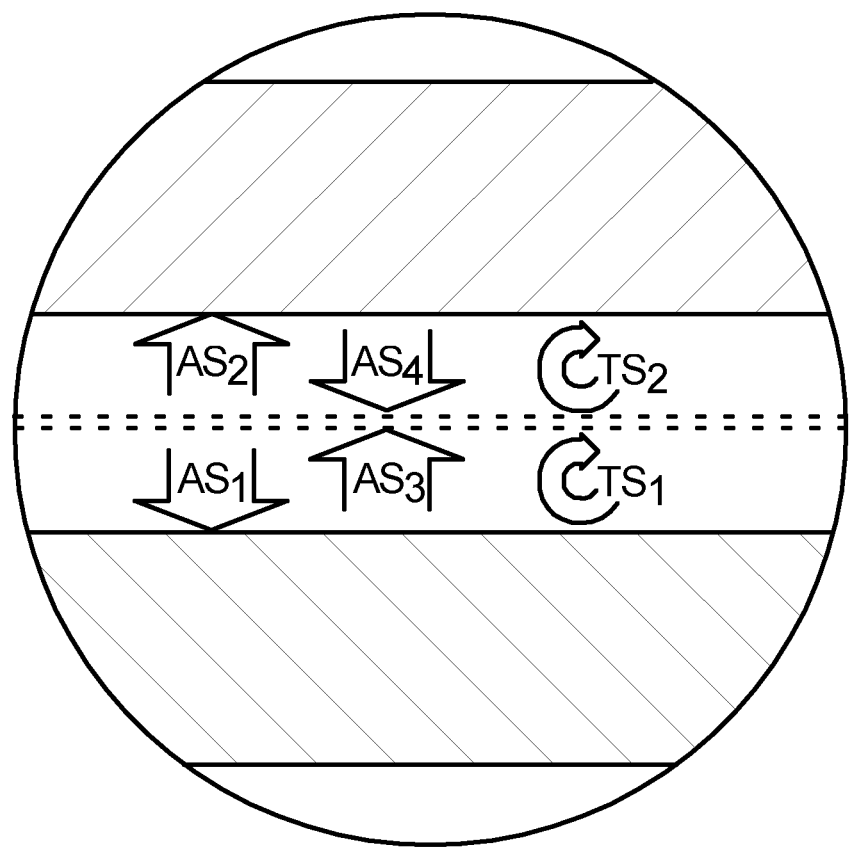
Figure 5B:
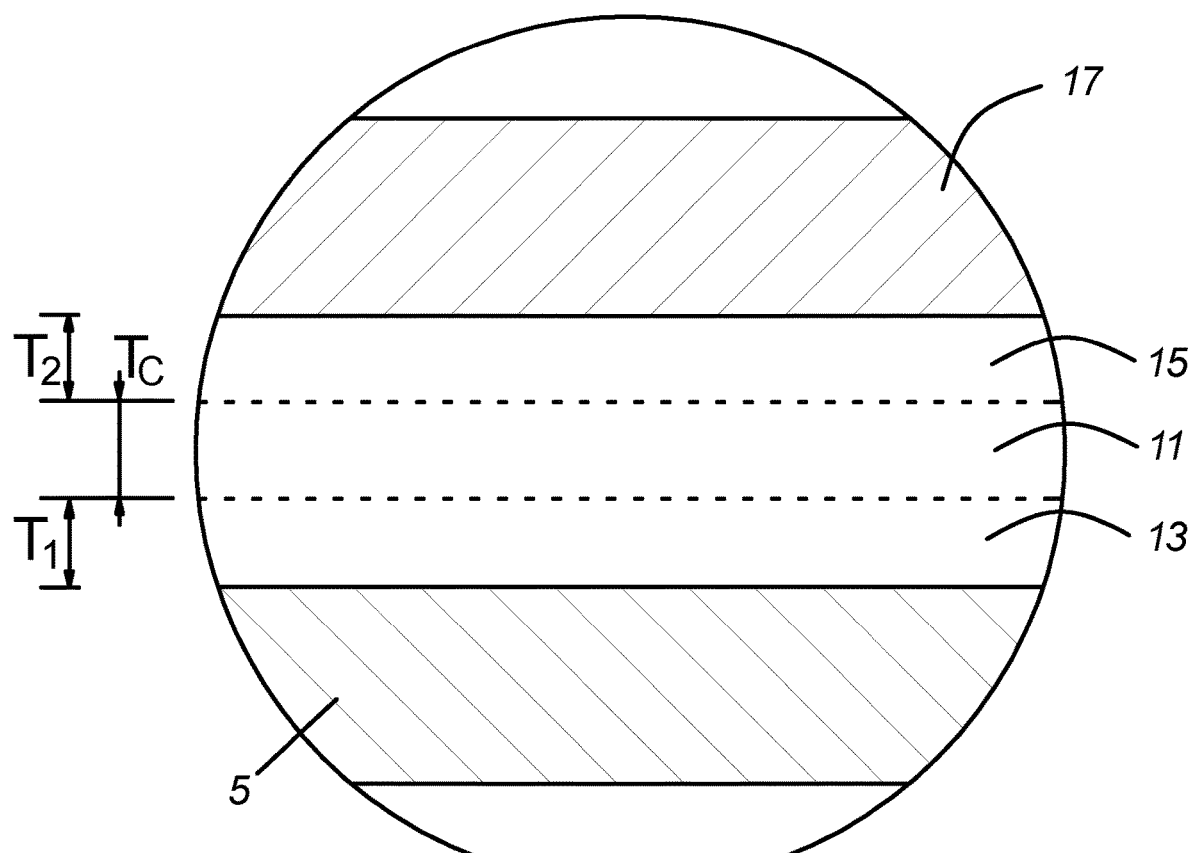

FIG. 5 and FIG. 5a-5b show thickness, adhesive and tensile strengths of the carrier 11 and first and second adhesive layer portions 13, 15 in a cross section and enlarged cross sections of embodiments of a coating system 1 according to the invention.

The first adhesive layer material and second adhesive layer material may be composed of identical or different materials.

FIG. 5a shows an enlargement of the coating system 1 in FIG. 5. The adhesive or bond strength $AS_1$, $AS_2$ of the first and second adhesive layer materials to the surface of the substrate 5 and to the coating layer 17 respectively is preferably between 6 and 12 MPa (ASTM D4541). The respective cohesive or tensile strength $TS_1$, $TS_2$ of said first adhesive layer material and second adhesive layer material is preferably between 4 and 6 MPa (ASTM D4541).

The first and second adhesive layer materials and carrier combination is configured for having an adhesive strength (AS3, AS4) that is less than their respective cohesive or tensile strength (TS1, TS2).

FIG. 5b shows an enlargement of another embodiment of a coating system 1 as illustrated in FIG. 5. The thickness $T_c$ of the carrier 11 or, in a stacked configuration as shown in FIG. 6b, a plurality of carriers 11', 11'', 11''', 11'''', may for example be in the range of 60 to 200 µm, e.g. 80 to 120 µm, each, preferably approx. 100 µm. The thickness $T_1$, $T_2$ of the first and second adhesive layer portion 13, 15 is preferably in the range of 40 to 300 µm, for example in the range of 60 to 100 µm, and in the range of 80 to 300 µm, for example in the range of 80 to 100 µm, respectively. For example, an embodiment with a carrier thickness being about the same or larger than the thickness of the first adhesive layer portion 13 and the thickness of the second adhesive layer portion 15, or an embodiment with adhesive layer portions thicker than the carrier, or an embodiment with a very thing first adhesive layer portion and a thicker second adhesive layer portion. Depending on the application technique, e.g. painting, spraying, etc., the thickness $T_1$, $T_2$ of the first and second adhesive layer portion 13, 15 may be fluctuating over the area covered by the coating system.

Figure 6A:
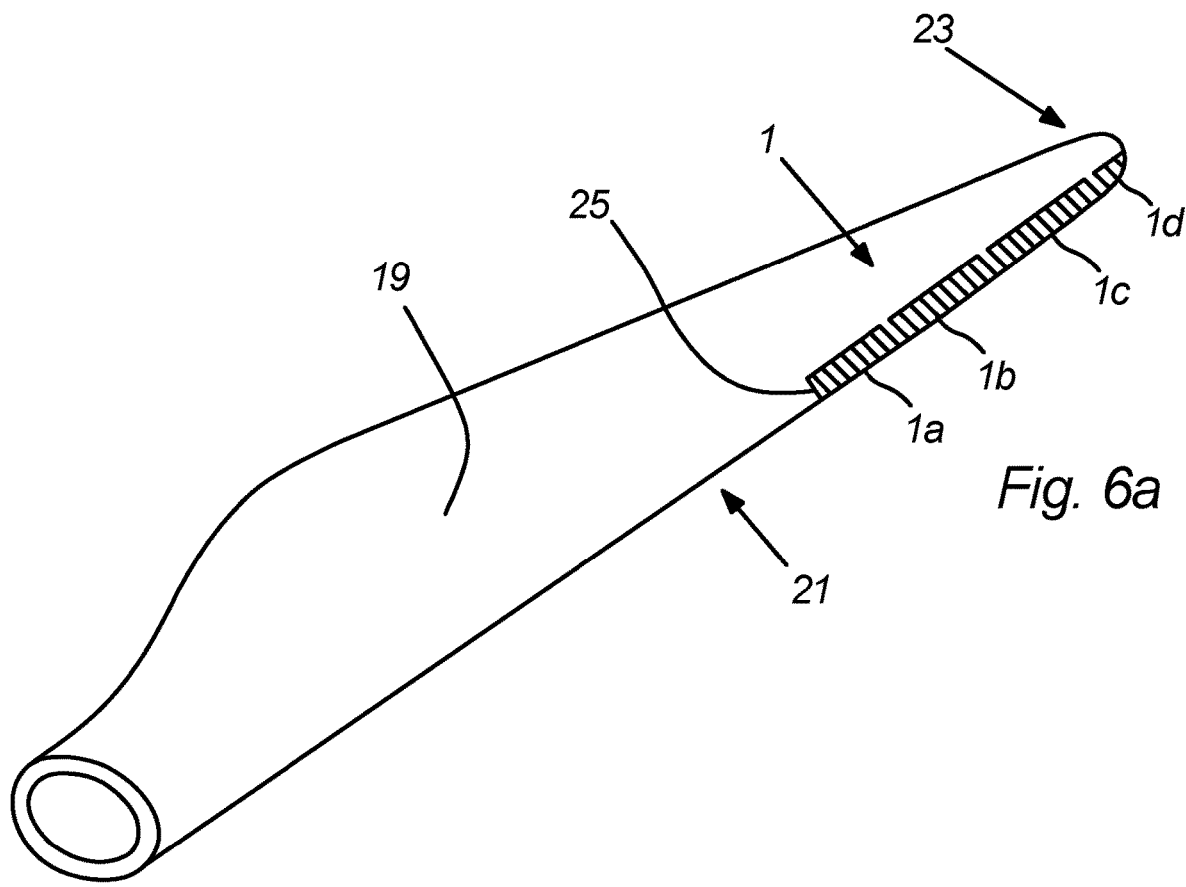
FIG. 6a shows a wind turbine blade as a substrate comprising a plurality of coating systems according to the invention.
Figure 6B:
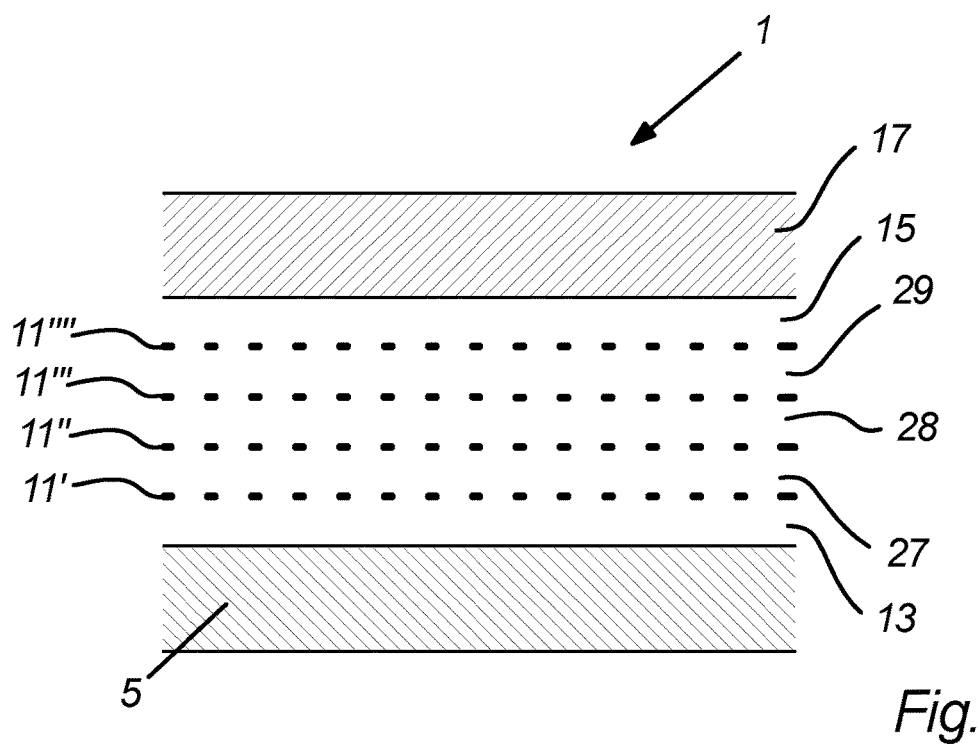
FIG. 6b shows a cross section of a further embodiment of a coating system according to the invention.

FIG. 6a shows a wind turbine blade 19 exemplifying an application of a substrate comprising a plurality of coating systems 1a, 1b, 1c, 1d according to the invention. The plurality of coating systems 1a, 1b, 1c, 1d is located in a side-by-side configuration along the leading edge 21 of the wind turbine blade with the one coating system 1d coating the surface at the blade tip 23.

The plurality of coating systems may be placed on the substrate as separate and independent systems i.e. with uncoated surface of the substrate in between adjacent systems.

The coating systems may also be placed on the substrate as partly overlapping systems i.e. with no uncoated surface of the substrate in between adjacent overlapping systems. The size of overlap between two systems may be just sufficient to also ensure a protection of the substrate in the area of the overlap e.g. to avoid any separate coating work in the area between adjacent coating systems.

The coating systems 1a, 1b, 1c, 1d may comprise one common or a plurality of separate embedded tear strips 25.

FIG. 6b shows a cross section of a further embodiment of a coating system 1 according to the invention. The coating system has a plurality of adhesive layer portions and carriers located in a stacked configuration between the coating layer 17 and the substrate 5 e.g. a wind turbine blade as disclosed in FIG. 6a.

The first adhesive layer portion 13 and the second adhesive layer portion 15 is located adjacent to the substrate 5 and the coating layer 17, respectively. A carrier 11' is located between the first adhesive layer portion 13 and a third adhesive layer portion 27 and a further carrier 11'' is located between the third adhesive layer portion 27 and a fourth adhesive layer portion 28. An even further carrier 11''' is located between the fourth adhesive layer portion 28 and a fifth adhesive layer portion 29. The last carrier 11'''' in the embodiment is located between the second adhesive layer portion 15 and the fifth adhesive layer portion 29.

Embodiments with stacked configurations comprising further or fewer carriers and adhesive layer portions than shown in FIG. 6b located between the first and second adhesive layer portion 13, 15 are also possible.

By including a plurality of carriers in a stacked configuration makes it possible to remove one carrier and the coating layer from a substrate as part of a repair method, while the stack of remaining carriers is recoated to establish the coating system on the substrate again, without the need to provide a new carrier. Hence, the coating system may easily be repaired as many times as the number of carriers included in the original stack, simply by applying new coating, preferably on a fresh second adhesive layer portion, without new carriers having to be refitted on the substrate.

Figure 7:
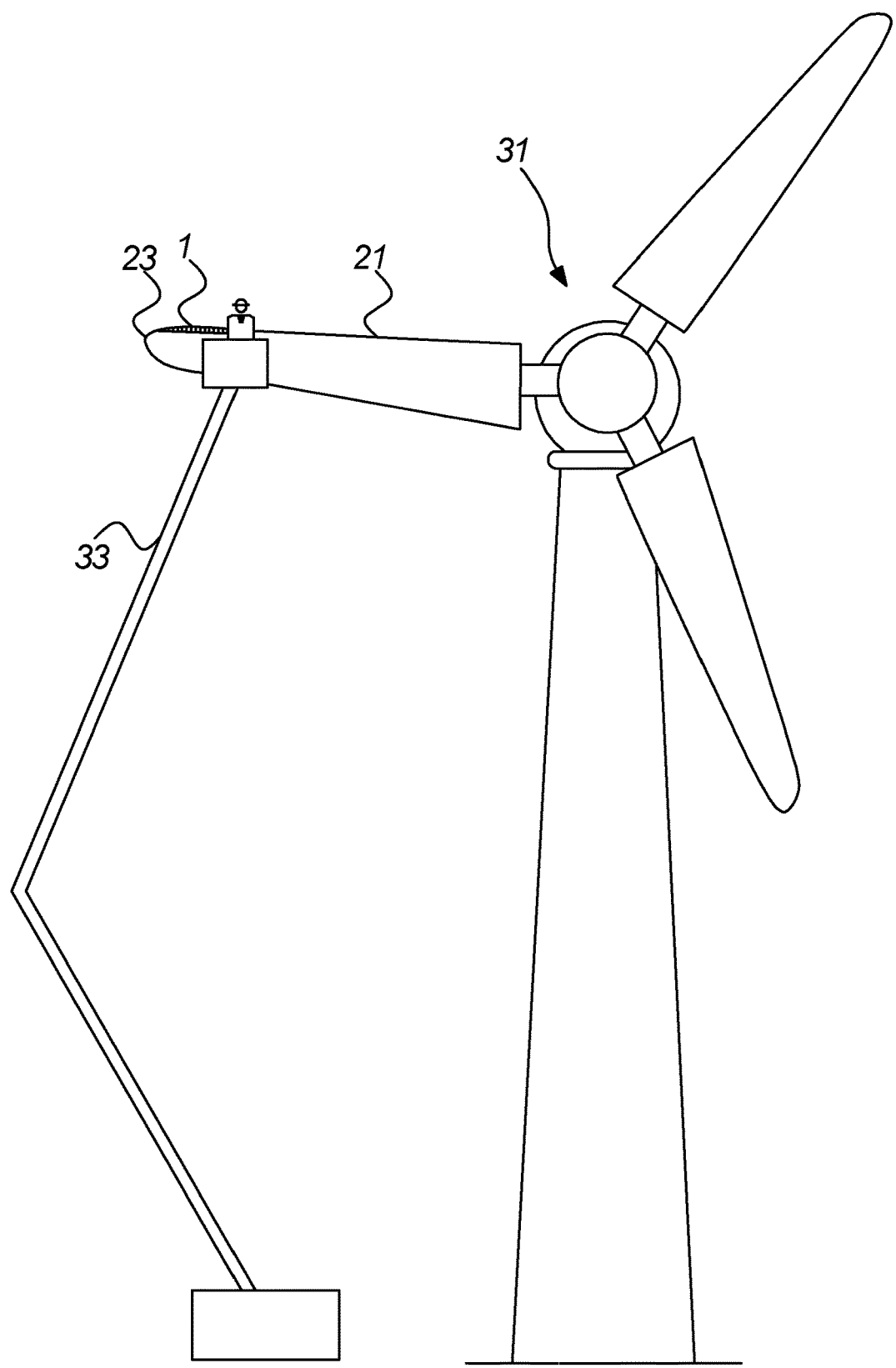
FIG. 7 shows application of a coating system according to the invention on a wind turbine blade of a wind turbine.

FIG. 7 shows application of a coating system 1 according to the invention on a wind turbine blade 21 of an operational wind turbine 31 such as an offshore wind turbine. The coating system 1 is being applied as part of a retrofit or repair method to the leading edge of the wind turbine blade in a locked standby position by a maintenance worker standing in a work basket of a maintenance crane 33. The repairing or retrofitting methods of embodiments of the present invention may also be performed by any other blade access techniques, for example rope access, for example with a service platform or personal harness suspended by wiring from the wind turbine nacelle. The coating 7 of the coating system may in this example preferably be a conventionally available leading edge protection material selected in consideration of the specific application, environment and cost-effectiveness.

Figure 8:
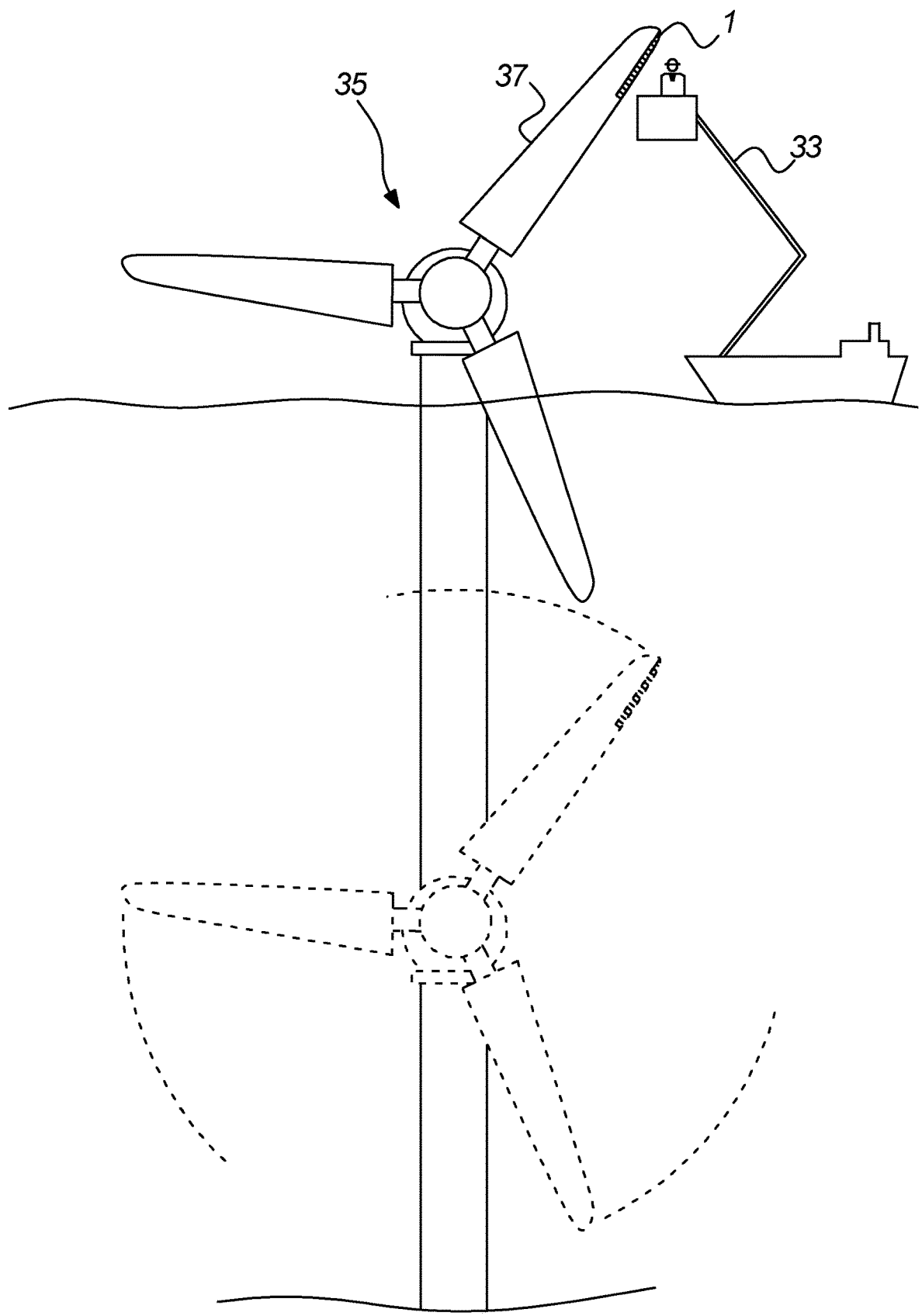
FIG. 8 shows application of a coating system according to the invention on a rotor blade of a tidal stream generator.

FIG. 8 shows application of a coating system 1 according to the invention on a rotor blade 37 of a tidal stream generator 35. The tidal stream generator is shown as located in an inactive position above the sea surface (full lines) and in an operational position below the sea surface (dotted lines). The coating system 1 is being applied as part of a retrofit or repair method to the leading edge of the rotor blade above the sea surface by a maintenance worker standing in a work basket of a maintenance crane 33.

The coating system 1 according to the invention may in a similar manner as shown in FIGS. 7 and 8 be applied to a blade of other offshore substrates as well as be applied to a blade of a gas turbine, steam turbine or water turbine, a leading edge surface of an aircraft or aerospace vehicle or an exposed surface of a building, for example in desert area.

It is to be noted that the figures and the above description have shown the example embodiments in a simple and schematic manner.

LIST

1. Coating system
1a, 1b, 1c, 1d. A plurality of coating systems
3. Surface of a substrate
5. Substrate
7. Coating
9. Adhesive layer
11. Carrier
11', 11", 11''', 11''''. Plurality of carriers
13. First adhesive layer portion
13'. Original first adhesive layer portion of a removed coating system
15. Second adhesive layer portion
16. Peeling force applied to a carrier
17. Coating layer
17', 17", 17'''. Plurality of coating layers
18. Exposed surface of the first adhesive layer portion
19. Wind turbine blade
21. Leading edge of the wind turbine blade
23. Tip of the wind turbine blade
25. Tear strips
27, 28, 29. Third, fourth and fifth adhesive layer portions
31. Wind turbine
33. Maintenance crane
35. Tidal stream generator
37. Rotor blade in a tidal stream generator
$AS_1$, $AS_2$. Adhesive or bond strength for a first and second adhesive layer material to the surface of the substrate and the coating, respectively
$AS_3$, $AS_4$. Adhesive or bond strength for a first and second adhesive layer material to the carrier
$TS_1$, $TS_2$. Cohesive or tensile strength of a first and second adhesive layer material
PF. Peeling force (16)
$T_1$, $T_2$. Thickness of a first and second adhesive layer portion
$T_c$. Thickness of a carrier

The invention claimed is:

1. A coating system for coating a surface of a substrate, the coating system comprising;
a coating, and an adhesive layer that is disposed between the substrate and the coating,
wherein the adhesive layer comprises a first adhesive layer portion adjacent to the substrate, a second adhesive layer portion adjacent to the coating, and a carrier placed between said first and second adhesive layer portions,
wherein the first adhesive layer portion is composed of a first adhesive layer material,
wherein the second adhesive layer portion is composed of a second adhesive layer material,
wherein the first adhesive layer material has an adhesive or bond strength to the surface of the substrate that exceeds the cohesive or tensile strength of the first adhesive layer material,
wherein and the second adhesive layer material has an adhesive or bond strength to the coating that exceeds the cohesive or tensile strength of the second adhesive layer material,
wherein the first adhesive layer material has an adhesive strength to the carrier that is less than the cohesive or tensile strength of the first adhesive layer material,
wherein the second adhesive layer material has an adhesive strength to the carrier that is less than the cohesive or tensile strength of the second adhesive layer material,
wherein the carrier has tensile properties such that the carrier in combination with the second adhesive layer portion and the coating will separate from the first adhesive layer portion when a peeling force is applied to the carrier,
wherein the adhesive or bond strength of the first adhesive layer material to the surface of the substrate is between 6 and 12 MPa and the cohesive or tensile strength of the first adhesive layer material is between 4 and 6 MPa,
wherein the adhesive or bond strength of the second adhesive layer material to the coating is between 6 and 12 MPa and the cohesive or tensile strength of the second adhesive layer material is between 4 and 6 MPa, and
wherein adhesive strength, bond strength, cohesive strength and tensile strength are each measured according to ASTM D4541.

2. The coating system of claim 1, wherein the first adhesive layer material and/or the second adhesive layer material and/or the coating are composed of identical materials.

3. The coating system of claim 1, wherein said first adhesive layer material and second adhesive layer material are composed of identical materials.

4. The coating system of claim 1, wherein the carrier has a plurality of apertures or perforations, wherein said plurality of apertures or perforations has a number, size, shape and distribution such that the first adhesive layer material flows through the carrier to the opposite side.

5. The coating system of claim 1, wherein the thickness of said carrier is in the range of 60 to 200 μm and the thickness of each of the first and second adhesive layer portions is in the range of 40 to 300 μm.

6. The coating system of claim 1, wherein the adhesive layer comprises a plurality of discrete carriers located in a side by side configuration.

7. The coating system of claim 1, wherein the adhesive layer comprises a plurality of discrete carriers located in a stacked configuration, and the adhesive layer comprises at least a third adhesive layer portion placed between said first and second adhesive layer portions.

8. The coating system of claim 1, wherein the coating is an erosion resistant material.

9. The coating system of claim 1, wherein each of the first and second adhesive layer materials comprises a material selected from among fillers, coatings, primers, adhesives, resins, non-reactive adhesives, hot-melt adhesives, reactive adhesives, multi-part adhesives, polyester resin, polyurethane resin, epoxy resin and single component adhesives.

10. The coating system of claim 1, wherein each of the first and second adhesive layer materials is polyurethane based and the carrier is a polyester based fabric.

11. The coating system of claim 1, wherein the coating system comprises an embedded tear strip.

12. The coating system of claim 1, wherein the first and/or second adhesive layer material comprises at least one selected from the group of curable adhesives and thermoplastics.

13. The coating system of claim 1, wherein the carrier comprises at least one selected from the group of a textile, a woven fabric, and a non-woven fabric, and the carrier has a plurality of apertures or perforations.

14. The coating system of claim 1, wherein the carrier comprises one or more selected from the group of natural fibers, bamboo, hemp, flax, polymeric fibers, nylon, aramid, polyester, inorganic fibers, glass, carbon, basalt, and metals.

15. The coating system of claim 1, wherein the carrier is a film having a plurality of apertures or perforations.

16. The coating system of claim 1, wherein said carrier comprises at least one selected from the group of a nylon fabric, a polyester fabric, a coated fiber reinforced glass fabric, and a peel ply.

17. The coating system of claim 1, wherein said carrier is a non-permeable film.

18. The coating system of claim 1, wherein the coating comprises a plurality of coating layers located on top of each other with each individual coating layer comprising different properties.

19. The coating system of claim 1, wherein the substrate comprises at least one selected from the group of a wind turbine blade, a leading edge of a wind turbine blade, a rotor blade of a tidal stream generator, a leading edge of a rotor blade of a tidal stream generator, a blade of a gas turbine, steam turbine or water turbine, a leading edge surface of an aircraft or aerospace vehicle, an exposed surface of a building, and a part of an offshore substrate.

* * * * *

UNITED STATES PATENT AND TRADEMARK OFFICE
CERTIFICATE OF CORRECTION

Page 1 of 1

PATENT NO. : 10,995,242 B2
APPLICATION NO. : 15/739262
DATED : May 4, 2021
INVENTOR(S) : Ditte Hofman Ibsen It is certified that error appears in the above-identified patent and that said Letters Patent is hereby corrected as shown below:

On the Title Page

(71) Applicant: change the applicant name to: Patentco ApS

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*